United States Patent
Jiang et al.

(10) Patent No.: US 9,350,396 B2
(45) Date of Patent: May 24, 2016

(54) SYSTEMS AND METHODS FOR REDUCING SIGNAL DISTORTION IN WIRELESS COMMUNICATION

(71) Applicant: Marvell World Trade Ltd., St Michael (BB)

(72) Inventors: Peichen Jiang, Shanghai (CN);
Junxiong Deng, San Diego, CA (US);
Taotao Yan, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/620,702

(22) Filed: Feb. 12, 2015

(65) Prior Publication Data

US 2015/0280755 A1    Oct. 1, 2015

Related U.S. Application Data

(60) Provisional application No. 61/970,632, filed on Mar. 26, 2014.

(51) Int. Cl.
*H04B 1/10* (2006.01)
*H04B 1/04* (2006.01)

(52) U.S. Cl.
CPC ...... *H04B 1/0475* (2013.01); *H04B 2001/0416* (2013.01); *H04B 2001/0425* (2013.01)

(58) Field of Classification Search
CPC ....... H03F 1/3247; H03F 1/32; H04B 1/0475; H04B 1/62; H04B 10/2507
USPC ................... 455/501, 63.1, 67.13, 114.3, 295
See application file for complete search history.

(56) References Cited

U.S. PATENT DOCUMENTS

| | | | | |
|---|---|---|---|---|
| 8,515,364 B2* | 8/2013 | Oliaei | ........... | H03F 3/16 455/114.1 |
| 8,750,411 B2* | 6/2014 | Schwent | ........... | H04L 27/2691 375/296 |
| 8,942,649 B2* | 1/2015 | Oliaei | ........... | H03F 3/16 455/114.1 |
| 8,976,897 B2* | 3/2015 | Vora | ........... | H03D 7/165 375/297 |
| 2014/0169237 A1* | 6/2014 | Furuta | ........... | H04L 5/143 370/278 |
| 2015/0044979 A1* | 2/2015 | Seckin | ........... | H04B 1/0475 455/114.2 |
| 2015/0288412 A1* | 10/2015 | Aalto | ........... | H04B 1/44 455/86 |

* cited by examiner

*Primary Examiner* — Sonny Trinh

(57) ABSTRACT

System and methods are provided for reducing signal distortion in wireless communication. An example system includes: an up-converter configured to generate a radio frequency signal based at least in part on a baseband signal for wireless communication and an oscillation signal; an amplifier configured to amplify the radio frequency signal and generate a transmission signal, the transmission signal including a first counter-intermodulation component associated with the up-converter and a second counter-intermodulation associated with the amplifier; and a signal generator configured to output a distortion-cancellation signal to the up-converter to reduce signal distortion associated with the first counter-intermodulation component and the second counter-intermodulation component.

20 Claims, 8 Drawing Sheets

SYSTEMS AND METHODS FOR REDUCING SIGNAL DISTORTION IN WIRELESS COMMUNICATION

CROSS-REFERENCE TO RELATED APPLICATIONS

This disclosure claims priority to and benefit from U.S. Provisional Patent Application No. 61/970,632, filed on Mar. 26, 2014, the entirety of which is incorporated herein by reference.

FIELD

The technology described in this patent document relates generally to wireless communication and more particularly to signal distortion reduction.

BACKGROUND

Wireless communication technology has been rapidly developed over the past few decades. One type of fourth generation (4G) wireless communication standards is Long Term Evolution (LTE). LTE defines multiple radio frequency (RF) bands and groups Orthogonal Frequency Division Multiple Access (OFDMA) modulated subcarriers into Resource Blocks (RB) for wireless transmission. Counter-intermodulation products (CIM) originating from the limited linearity of a transmitter's baseband (BB) may cause signal distortion in wireless communication. For example, CIM products may fall into a receiving band and degrade the frequency division duplexing (FDD) performance. CIM products may also fall into protected bands and violate spectral emission requirements.

SUMMARY

In accordance with the teachings described herein, system and methods are provided for reducing signal distortion in wireless communication. An example system includes: an up-converter configured to generate a radio frequency signal based at least in part on a baseband signal for wireless communication and an oscillation signal; an amplifier configured to amplify the radio frequency signal and generate a transmission signal, the transmission signal including a first counter-intermodulation component associated with the up-converter and a second counter-intermodulation associated with the amplifier; and a signal generator configured to output a distortion-cancellation signal to the up-converter to reduce signal distortion associated with the first counter-intermodulation component and the second counter-intermodulation component.

In another embodiment, a system for reducing signal distortion in wireless communication includes: an up-converter configured to generate a radio frequency signal based at least in part on a baseband signal for wireless communication and an oscillation signal; and an amplifier configured to amplify the radio frequency signal and generate a transmission signal, the transmission signal including a first counter-intermodulation component associated with the up-converter and a second counter-intermodulation associated with the amplifier. The up-converter is further configured to change the radio frequency signal to adjust the first counter-intermodulation component in the transmission signal to reduce signal distortion associated with the first counter-intermodulation component and the second counter-intermodulation component.

In another embodiment, a method is provided for reducing signal distortion. A radio frequency signal is generated based at least in part on a baseband signal for wireless communication and an oscillation signal. The radio frequency signal is amplified. A transmission signal is generated. The transmission signal includes a first counter-intermodulation component and a second counter-intermodulation component. A distortion-cancellation signal is generated to reduce signal distortion associated with the first counter-intermodulation component and the second counter-intermodulation component.

In yet another embodiment, a method is provided for reducing signal distortion. A radio frequency signal is generated based at least in part on a baseband signal for wireless communication and an oscillation signal. The radio frequency signal is amplified. A transmission signal is generated. The transmission signal includes a first counter-intermodulation component and a second counter-intermodulation component. The radio frequency signal is changed to adjust the first counter-intermodulation component in the transmission signal to reduce signal distortion associated with the first counter-intermodulation component and the second counter-intermodulation component.

DETAILED DESCRIPTION

Under LTE, performance of a transmitter is often evaluated based on third order non-linearity, for example, counter-IM3 (CIM3) products in the output signal of the transmitter. Certain approaches have been implemented to improve the CIM3 performance of a transmitter. For example, the C-IM3 performance of a transmitter often depends on the linearity of a voltage-current converter in the transmitter. A large DC current needs to be applied to the voltage-current converter to improve linearity, which, however, results in high power consumption.

Figure 1:
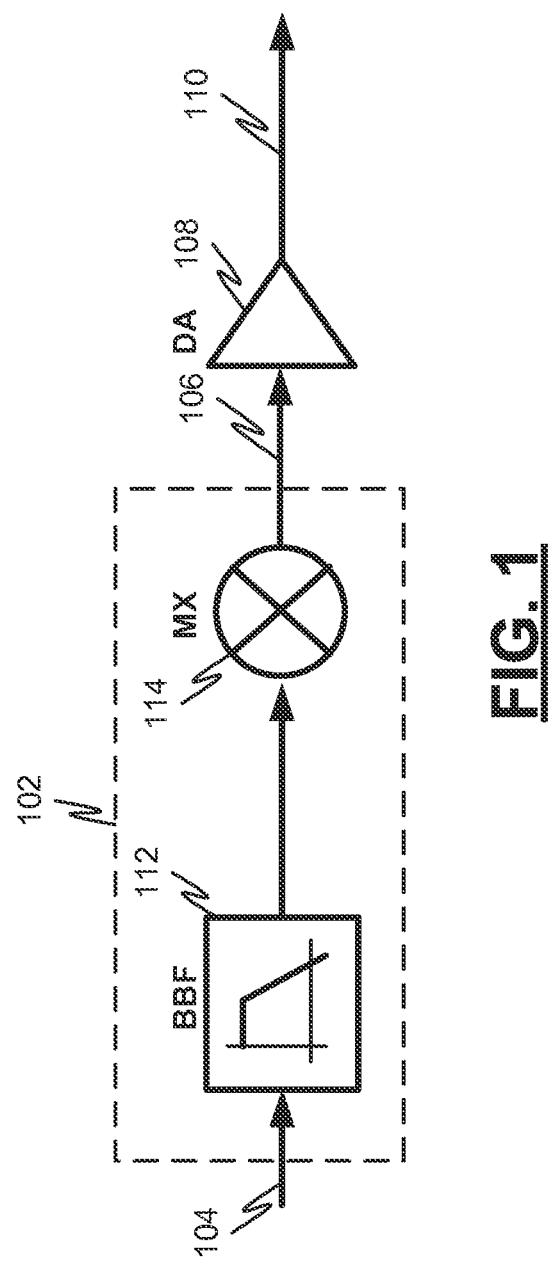
FIG. 1 depicts an example diagram showing a system for reducing signal distortion.

FIG. 1 depicts an example diagram showing a system for reducing signal distortion. As shown in FIG. 1, an up-converter 102 receives a baseband signal 104 for wireless communication and generates a radio frequency (RF) signal 106, and a driver amplifier 108 amplifies the RF signal 106 to generate a transmission signal 110. The transmission signal 110 may include one or more counter-intermodulation components which are generated by the up-converter 102 and/or the driver amplifier 108. A distortion-cancellation mechanism may be implemented to reduce signal distortion associated with the one or more counter-intermodulation components in the transmission signal 110.

In some embodiments, a distortion-cancellation signal may be introduced into the up-converter 102 to cancel at least part of the one or more counter-intermodulation components in the transmission signal 110. In certain embodiments, instead of injecting the distortion-cancellation signal to the transmission path, the up-converter 102 adjusts the RF signal 106 so that the counter-intermodulation components cancel each other out to reduce the signal distortion. For example, the up-converter 102 includes a baseband filter 112 which filters the baseband signal 104 and a mixer 114 which multiplies the baseband signal 104 with a suitable oscillation signal generated by a local oscillator.

Figure 2:
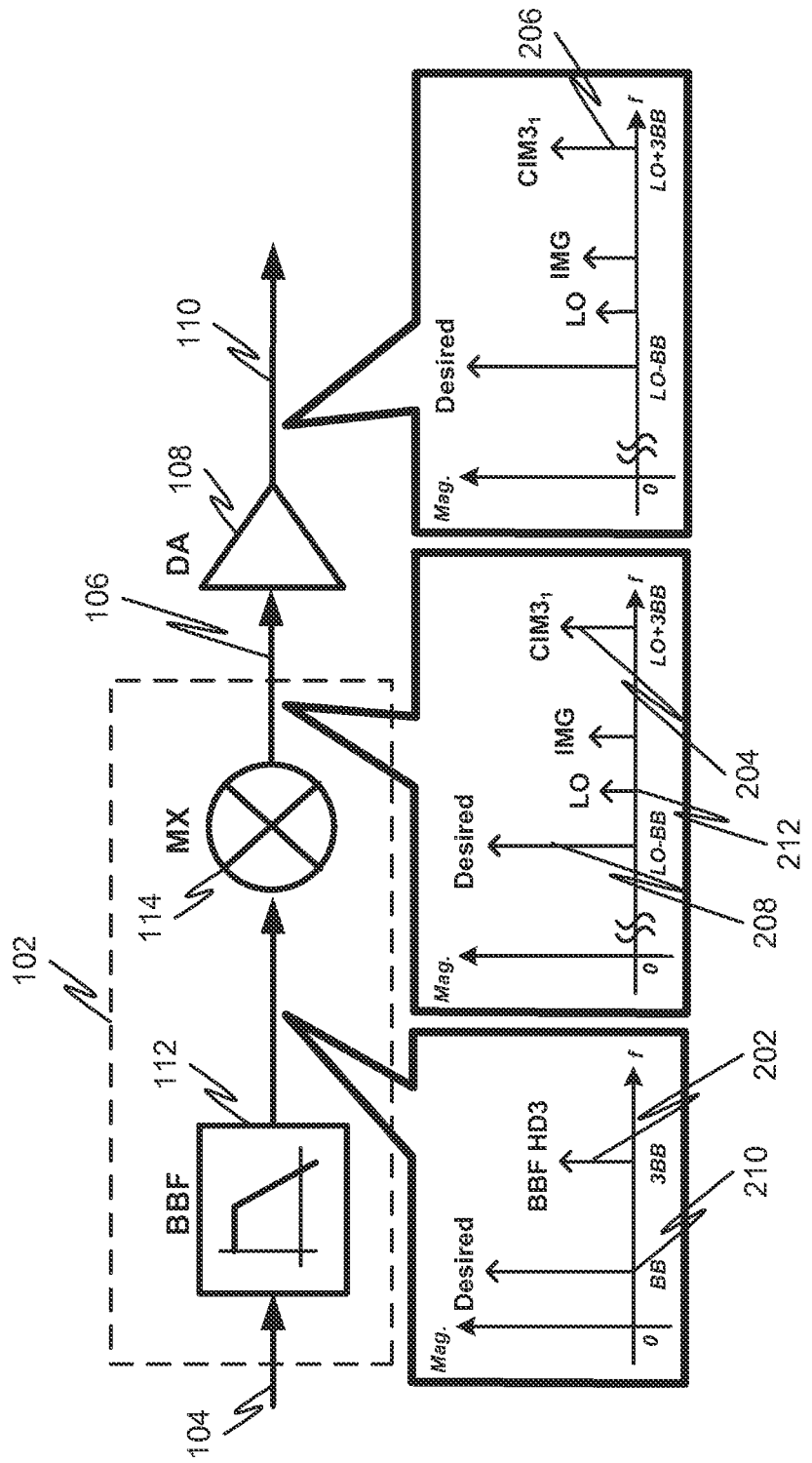
FIG. 2 depicts an example diagram showing counter-intermodulation generation by an up-converter

As discussed above, the counter-intermodulation components in the transmission signal 110 may be generated by the up-converter 102 and/or the driver amplifier 108. FIG. 2 depicts an example diagram showing counter-intermodulation generation by the up-converter 102. As shown in FIG. 2, the non-linearity of the baseband filter 112 causes the generation of a harmonic distortion signal 202 (e.g., a third-order harmonic distortion component), and the mixer 114 converts the signal 202 into a counter-intermodulation component 204 in the RF signal 106. The amplifier 108 amplifies the counter-intermodulation component 204 and generates a counter-intermodulation component 206 ($CIM3_1$) in the transmission signal 110.

Specifically, the baseband signal 104 corresponds to a baseband frequency 210 (BB). The harmonic distortion signal 202 corresponds to a distortion frequency approximately equal to three times a baseband frequency 210 (3BB). As the mixer 114 combines the harmonic distortion signal 202 and an oscillation signal with an oscillation frequency 212 (LO) to generate the counter-intermodulation component 204. As shown in FIG. 2, the frequency of the counter-intermodulation component 204 is approximately equal to a sum of the oscillation frequency 212 and three times the baseband frequency 210 (LO+3BB). For example, the amplifier 108 linearly amplifies the counter-intermodulation component 204, and thus the counter-intermodulation component 206 in the transmission signal 110 corresponds to approximately a same frequency as the counter-intermodulation component 204 in the RF signal 106. After the processing of the up-converter 102, a desired signal 208 corresponds to a frequency approximately equal to a difference between the oscillation frequency and the baseband frequency (LO−BB). As an example, the oscillation signal with the oscillation frequency 212 (LO) is generated by a local oscillator and corresponds to a square wave.

Figure 3:
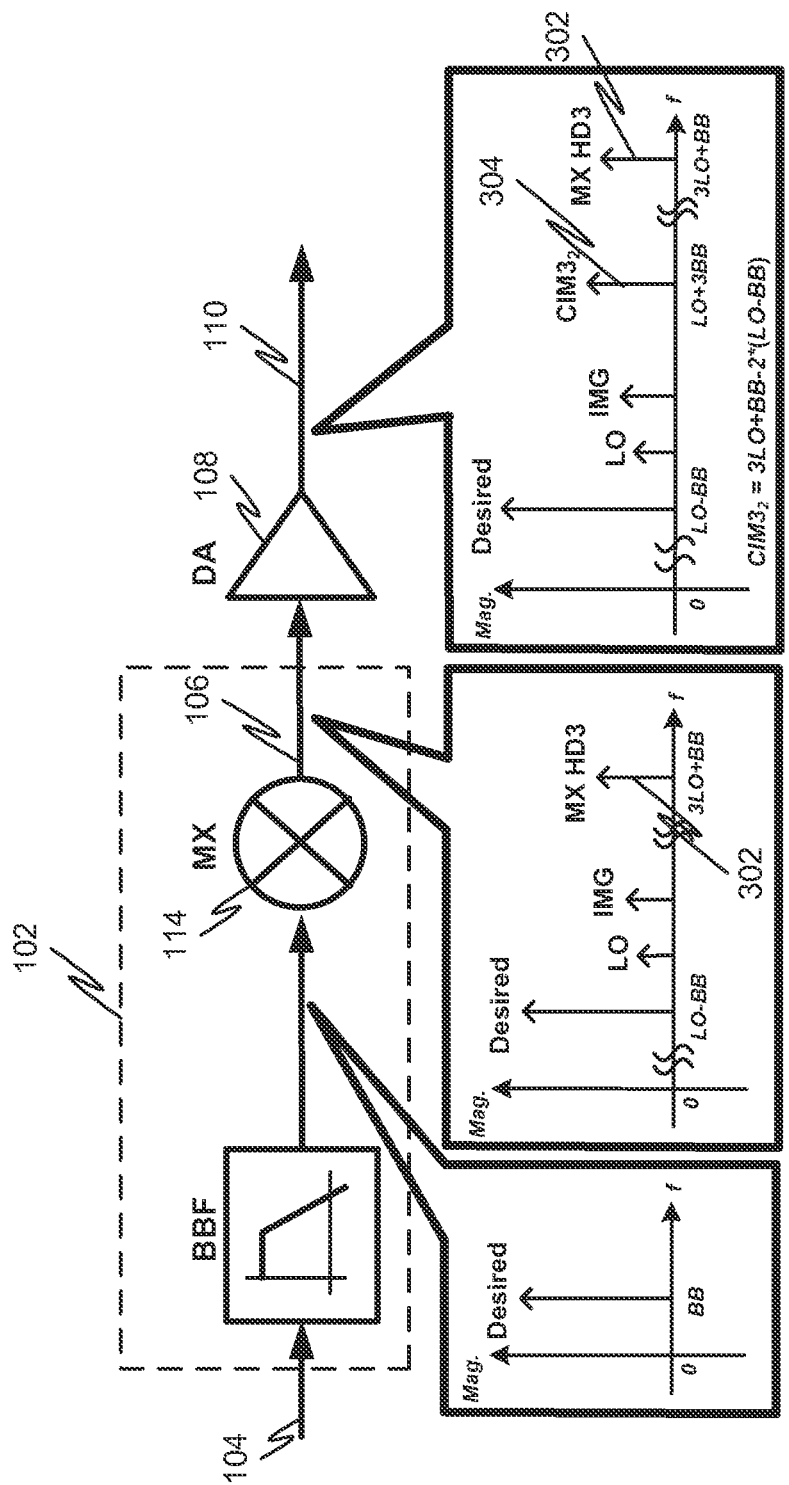
FIG. 3 depicts an example diagram showing counter-intermodulation generation by a driver amplifier.

FIG. 3 depicts an example diagram showing counter-intermodulation generation by the amplifier 108. As shown in FIG. 3, the mixer 114 generates a harmonic distortion component 302 in the RF signal 106, and the amplifier 108 generates a counter-intermodulation component 304 ($CIM3_2$) in the transmission signal 110 based at least in part on the harmonic distortion component 302.

Specifically, the mixer 114 combines the baseband signal 104 with the third harmonic of the oscillation signal to generate the harmonic distortion component 302. The harmonic distortion component 302 corresponds to a frequency approximately equal to (3LO+BB). The intermodulation of the harmonic distortion component 302 and the desired signal 208 in the amplifier 108 causes the generation of the counter-intermodulation component 304 which corresponds to a frequency approximately equal to (LO+3BB).

Figure 4A:
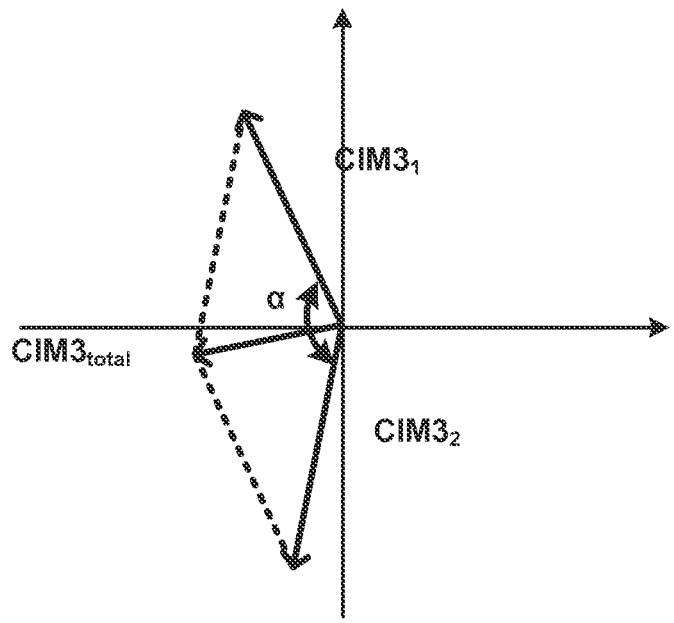
FIG. 4(A) and FIG. 4(B) depict example diagrams for reducing signal distortion.
Figure 4B:
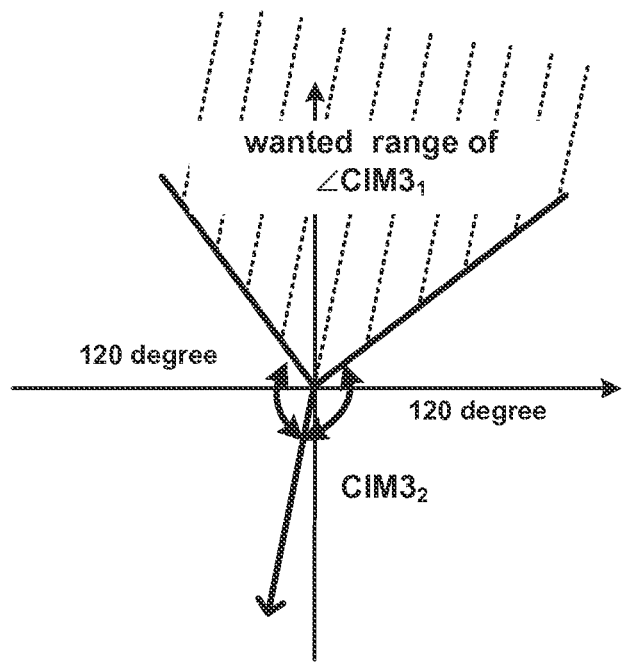
Figure 5:
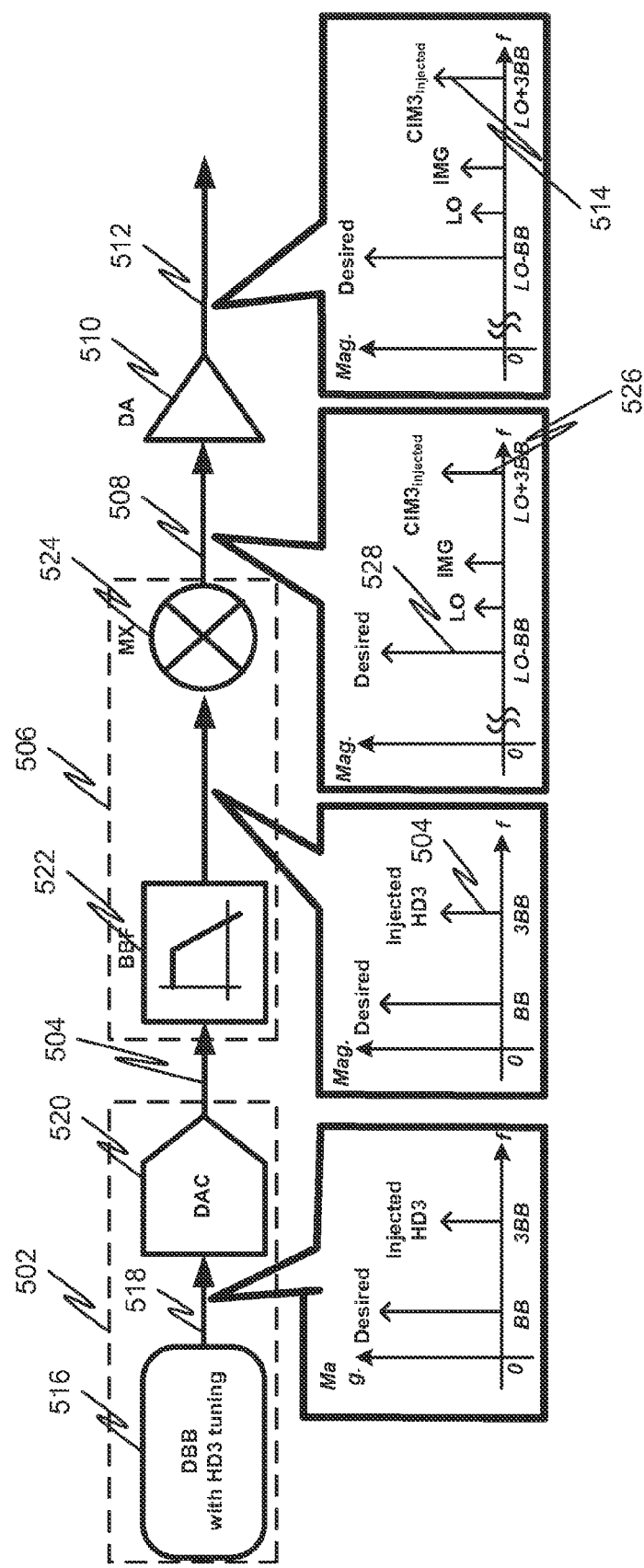
FIG. 5 depicts another example diagram of a system for reducing signal distortion.
Figure 6A:
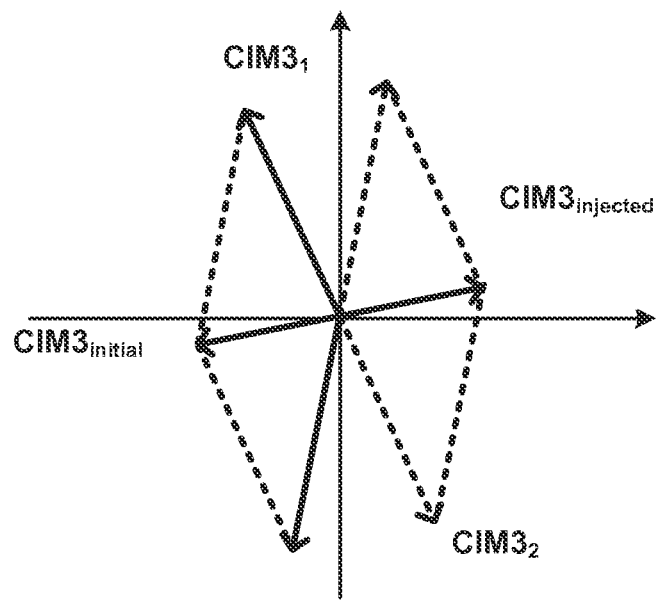
FIG. 6(A) and FIG. 6(B) depict example diagrams for reducing signal distortion.
Figure 6B:
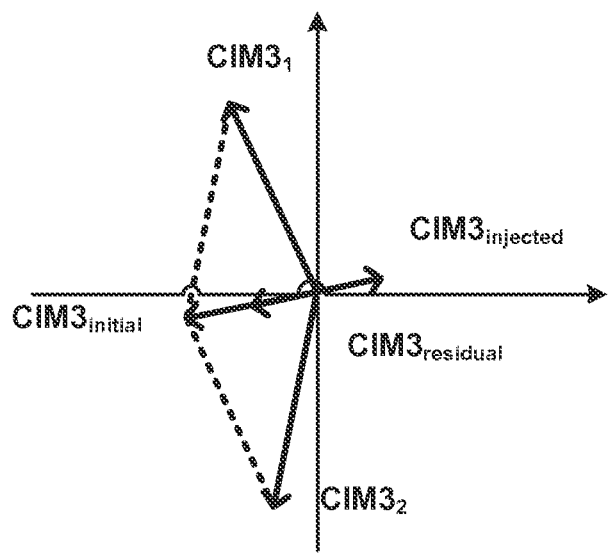

As shown in FIG. 2 and FIG. 3, signal distortion of the transmission signal 110 is associated with the counter-intermodulation component 206 ($CIM3_1$) generated by the up-converter 102 and the counter-intermodulation component 304 ($CIM3_2$) generated by the amplifier 108. The counter-intermodulation component 206 ($CIM3_1$) and the counter-intermodulation component 304 ($CIM3_2$) are not correlated. Two approaches can be implemented to reduce the signal distortion associated with these two counter-intermodulation components. In some embodiments, as shown in FIG. 4(A) and FIG. 4(B) below, the up-converter 102 adjusts the counter-intermodulation component 206 ($CIM3_1$) so that the counter-intermodulation component 206 ($CIM3_1$) and the counter-intermodulation component 304 ($CIM3_2$) can cancel each other to reduce the signal distortion. In certain embodiments, a distortion-cancellation signal is introduced into the up-converter 102 to inject another counter-intermodulation component in the transmission signal 110 to cancel the counter-intermodulation component 206 ($CIM3_1$) and the counter-intermodulation component 304 ($CIM3_2$), as shown in FIG. 5, FIG. 6(A) and FIG. 6(B) below.

FIG. 4(A) and FIG. 4(B) depict example diagrams for reducing signal distortion. As shown in FIG. 4(A), total counter-intermodulation corresponds to a vector sum of the counter-intermodulation component 206 ($CIM3_1$) and the counter-intermodulation component 304 ($CIM3_2$) as follows:

$$|CIM3_{total}|^2 = |CIM3_1|^2 + |CIM3_2|^2 - 2|CIM3_1||CIM3_2|\cos(180°-\alpha) \quad (1)$$

where α represents a phase difference of the counter-intermodulation component 206 ($CIM3_1$) and the counter-intermodulation component 304 ($CIM3_2$).

In some embodiments, the counter-intermodulation component 206 ($CIM3_1$) has a larger magnitude than the counter-intermodulation component 304 ($CIM3_2$). That is, $|CIM3_1|>|CIM3_2|$. The total counter-intermodulation has a smaller magnitude than the counter-intermodulation component 206 ($CIM3_1$) to reduce signal distortion, i.e., $|CIM3_1|>|CIM3_{total}|$.

$$|CIM3_1|^2 + |CIM3_2|^2 - 2|CIM3_1||CIM3_2|\cos(180°-\alpha) < |CIM3_1|^2 \quad (2)$$

$$\cos(180°-\alpha) > \frac{|CIM3_2|}{2|CIM3_1|} \quad (3)$$

As shown in FIG. 4(B), the up-converter 102 adjusts the phase of the counter-intermodulation component 206 ($CIM3_1$) to a proper range so that the counter-intermodulation component 206 ($CIM3_1$) and the counter-intermodulation component 304 ($CIM3_2$) are out of phase and can cancel each other to reduce the total counter-intermodulation. In certain embodiments, the up-converter 102 adjusts both the phase and the magnitude of the counter-intermodulation component 206 ($CIM3_1$) so that the counter-intermodulation component 206 ($CIM3_1$) and the counter-intermodulation component 304 ($CIM3_2$) can cancel each other out to minimize the total counter-intermodulation.

FIG. 5 depicts another example diagram of a system for reducing signal distortion. As shown in FIG. 5, a signal generator 502 generates a distortion-cancellation signal 504 to the up-converter 506. The up-converter 506 generates a RF signal 508, and a driver amplifier 510 amplifies the RF signal 508 to generate a transmission signal 512. The introduction of the distortion-cancellation signal 504 results in the generation of an injected counter-intermodulation component 514 ($CIM3_{injected}$) in the transmission signal 512. The signal generator 502 adjusts the distortion-cancellation signal 504 to reduce the signal distortion associated with counter-intermodulation components in the transmission signal 512.

Specifically, within the signal generator 502, a digital baseband unit 516 generates an input signal 518, and a digital-to-analog converter 520 converts the input signal 518 to the distortion-cancellation signal 504 which corresponds to a cancellation frequency of approximately three times a baseband frequency (3BB). A baseband filter 522 in the up-converter 506 filters the distortion-cancellation signal 504 and a mixer 524 combines the signal 504 and an oscillation signal with an oscillation frequency (LO) to generate a counter-intermodulation component 526 in the RF signal 508. The frequency associated with the counter-intermodulation component 526 is approximately equal to a sum of the oscillation frequency and three times the baseband frequency (LO+3BB). For example, the amplifier 510 linearly amplifies the counter-intermodulation component 526, and thus the counter-intermodulation component 514 in the transmission signal 512 corresponds to approximately a same frequency as the counter-intermodulation component 526 in the RF signal 508. In some embodiments, a desired signal 528 corresponds to a frequency approximately equal to a difference between the oscillation frequency and the baseband frequency (LO−BB). The oscillation signal with the oscillation frequency (LO) is generated by a local oscillator and corresponds to a square wave.

The transmission signal 512 may include other counter-intermodulation components (not shown). For example, the transmission signal 512 includes a counter-intermodulation component ($CIM3_1$) generated by the up-converter 506 and a counter-intermodulation component ($CIM3_2$) generated by the amplifier 510, and these counter-intermodulation components are similar to what are shown in FIG. 2 and FIG. 3.

FIG. 6(A) and FIG. 6(B) depict example diagrams for reducing signal distortion. Total counter-intermodulation corresponds to a vector sum of the counter-intermodulation component ($CIM3_1$) generated by the up-converter 506, the counter-intermodulation component ($CIM3_2$) generated by the amplifier 510 and the counter-intermodulation component 514 ($CIM3_{injected}$).

Specifically, a vector sum of the counter-intermodulation component ($CIM3_1$) and the counter-intermodulation component ($CIM3_2$) can be determined as follows:

$$|CIM3_{initial}|^2 = |CIM3_1|^2 + |CIM3_2|^2 - 2|CIM3_1\|CIM3_2|\cos(180°-\alpha) \quad (4)$$

where $CIM3_{initial}$ represents the vector sum of the counter-intermodulation component ($CIM3_1$) and the counter-intermodulation component ($CIM3_2$), and $\alpha$ represents a phase difference of the counter-intermodulation component ($CIM3_1$) and the counter-intermodulation component ($CIM3_2$). The total counter-intermodulation ($CIM3_{residual}$) is determined as follows:

$$|CIM3_{residual}|^2 = |CIM3_{initial}|^2 + |CIM3_{injected}|^2 - 2|CIM3_{initial}\|CIM3_{injected}|\cos(180°-\beta) \quad (5)$$

where $\beta$ represents a phase difference of the counter-intermodulation component 514 ($CIM3_{injected}$) and the vector sum of the counter-intermodulation component ($CIM3_1$) and the counter-intermodulation component ($CIM3_2$).

In some embodiments, the signal generator 502 adjusts the distortion-cancellation signal 504 to change the phase and/or the magnitude of the injected counter-intermodulation component 514 ($CIM3_{injected}$) so that the counter-intermodulation component 514 cancels $CIM3_{initial}$, to reduce signal distortion. For example, the phase difference between the counter-intermodulation component 514 ($CIM3_{injected}$) and $CIM3_{initial}$ is approximately equal to 180°, as shown in FIG. 6(A). The total counter-intermodulation ($CIM3_{residual}$) has a smaller magnitude than the vector sum of the counter-intermodulation component ($CIM3_1$) and the counter-intermodulation component ($CIM3_2$), as shown in FIG. 6(B).

Figure 7:
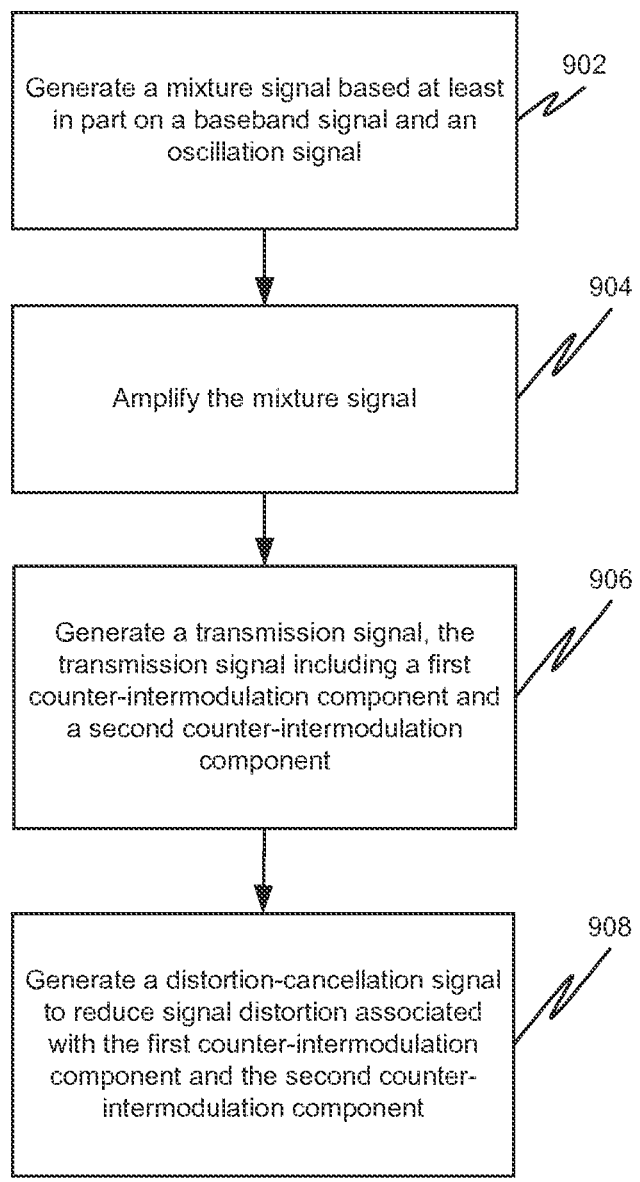
FIG. 7 depicts an example flow chart for reducing signal distortion.

FIG. 7 depicts an example flow chart for reducing signal distortion. At 902, a RF signal is generated based at least in part on a baseband signal is received for wireless communication and an oscillation signal. At 904, the RF signal is amplified. At 906, a transmission signal is generated. The transmission signal includes a first counter-intermodulation component and a second counter-intermodulation component. For example, the first counter-intermodulation component and the second counter-intermodulation component are not correlated. At 908, a distortion-cancellation signal is generated to reduce signal distortion associated with the first counter-intermodulation component and the second counter-intermodulation component.

Figure 8:
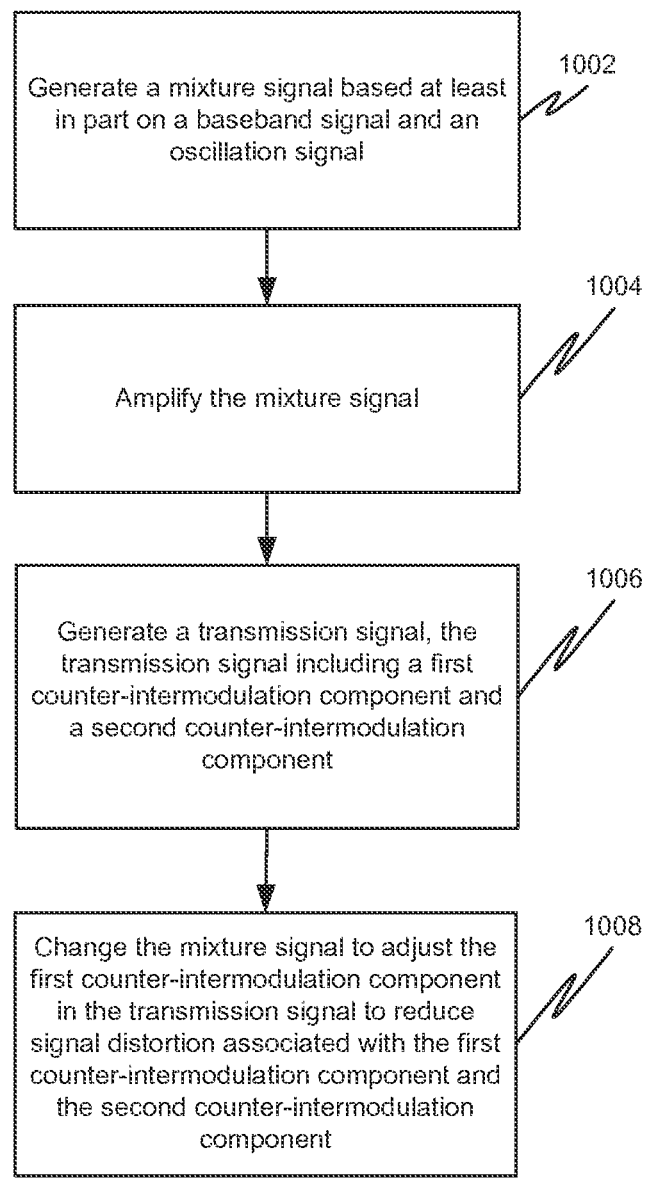
FIG. 8 depicts another example flow chart for reducing signal distortion.

FIG. 8 depicts another example flow chart for reducing signal distortion. At 1002, a RF signal is generated based at least in part on a baseband signal is received for wireless communication and an oscillation signal. At 1004, the RF signal is amplified. At 1006, a transmission signal is generated. The transmission signal includes a first counter-intermodulation component and a second counter-intermodulation component. For example, the first counter-intermodulation component and the second counter-intermodulation component are not correlated. At 1008, the RF signal is changed to adjust the first counter-intermodulation component in the transmission signal to reduce signal distortion associated with the first counter-intermodulation component and the second counter-intermodulation component.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A system for reducing signal distortion in wireless communication, the system comprising:
    an up-converter configured to generate a radio frequency signal based at least in part on a baseband signal for wireless communication and an oscillation signal;
    an amplifier configured to amplify the radio frequency signal and generate a transmission signal, the transmission signal including a first counter-intermodulation component associated with the up-converter and a second counter-intermodulation associated with the amplifier, and
    a signal generator configured to output a distortion-cancellation signal to the up-converter to reduce signal distortion associated with the first counter-intermodulation component and the second counter-intermodulation component.

2. The system of claim 1, wherein the signal generator includes:
a digital baseband unit configured to generate an input signal; and
a digital-to-analog converter configured to convert the input signal to the distortion-cancellation signal.

3. The system of claim 2, wherein:
the baseband signal corresponds to a baseband frequency;
the oscillation signal corresponds to an oscillation frequency; and
the distortion-cancellation signal corresponds to a cancellation frequency approximately equal to three times the baseband frequency.

4. The system of claim 1, wherein the up-converter and the amplifier are further configured to generate an injected counter-intermodulation component in the transmission signal based at least in part on the distortion-cancellation signal.

5. The system of claim 4, wherein
the baseband signal corresponds to a baseband frequency;
the oscillation signal corresponds to an oscillation frequency; and
the injected counter-intermodulation component corresponds to an injection frequency approximately equal to a sum of the oscillation frequency and three times the baseband frequency.

6. The system of claim 4, wherein the signal distortion is associated with total counter-intermodulation determined by performing one or more vector addition operations on the injected counter-intermodulation component, the first counter-intermodulation component and the second counter-intermodulation signal.

7. The system of claim 1, wherein:
the baseband signal corresponds to a baseband frequency;
the oscillation signal corresponds to an oscillation frequency; and
the first counter-intermodulation component corresponds to a first frequency approximately equal to a sum of the oscillation frequency and three times the baseband frequency.

8. The system of claim 1, wherein:
the baseband signal corresponds to a baseband frequency;
the oscillation signal corresponds to an oscillation frequency; and
the second counter-intermodulation component corresponds to a second frequency approximately equal to a sum of the oscillation frequency and three times the baseband frequency.

9. The system of claim 1, wherein the signal generator is further configured to adjust a phase of the distortion-cancellation signal to reduce the signal distortion associated with the first counter-intermodulation component and the second counter-intermodulation component.

10. The system of claim 1, wherein the signal generator is further configured to adjust a magnitude of the distortion-cancellation signal to reduce the signal distortion associated with the first counter-intermodulation component and the second counter-intermodulation component.

11. The system of claim 1, wherein the up-converter includes:
a baseband filter configured to filter the baseband signal; and
a mixer configured to multiply the baseband signal with the oscillation signal to generate the radio frequency signal.

12. The system of claim 11, wherein:
the mixer is further configured to generate a distortion component in the radio frequency signal; and
the amplifier is further configured to generate the first counter-intermodulation component in the transmission signal based at least in part on the distortion component.

13. A system for reducing signal distortion in wireless communication, the system comprising:
an up-converter configured to generate a radio frequency signal based at least in part on a baseband signal for wireless communication and an oscillation signal; and
an amplifier configured to amplify the radio frequency signal and generate a transmission signal, the transmission signal including a first counter-intermodulation component associated with the up-converter and a second counter-intermodulation associated with the amplifier;
the up-converter being further configured to change the radio frequency signal to adjust the first counter-intermodulation component in the transmission signal to reduce signal distortion associated with the first counter-intermodulation component and the second counter-intermodulation component.

14. The system of claim 13, wherein the up-converter includes:
a baseband filter configured to filter the baseband signal; and
a mixer configured to multiply the baseband signal with the oscillation signal to generate the radio frequency signal.

15. The system of claim 13, wherein:
the up-converter is further configured to generate a distortion component in the radio frequency signal; and
the amplifier is further configured to generate the first counter-intermodulation component in the transmission signal based at least in part on the distortion component.

16. The system of claim 15, wherein the up-converter is further configured to adjust a phase of the distortion component to reduce the signal distortion associated with the first counter-intermodulation component and the second counter-intermodulation component.

17. The system of claim 15, wherein the up-converter is further configured to adjust a magnitude of the distortion component to reduce the signal distortion associated with the first counter-intermodulation component and the second counter-intermodulation component.

18. The system of claim 13, wherein:
the baseband signal corresponds to a baseband frequency;
the oscillation signal corresponds to an oscillation frequency; and
the first counter-intermodulation component corresponds to a first frequency approximately equal to a sum of the oscillation frequency and three times the baseband frequency; and
the second counter-intermodulation component corresponds to a second frequency approximately equal to a sum of the oscillation frequency and three times the baseband frequency.

19. A method for reducing signal distortion in wireless communication, the method comprising:
generating a radio frequency signal based at least in part on a baseband signal for wireless communication and an oscillation signal;
amplifying the radio frequency signal;
generating a transmission signal, the transmission signal including a first counter-intermodulation component and a second counter-intermodulation; and
generating a distortion-cancellation signal to reduce signal distortion associated with the first counter-intermodulation component and the second counter-intermodulation component.

20. A method for reducing signal distortion in wireless communication, the method comprising:
- generating a radio frequency signal based at least in part on a baseband signal for wireless communication and an oscillation signal;
- amplifying the radio frequency signal;
- generating a transmission signal, the transmission signal including a first counter-intermodulation component and a second counter-intermodulation; and
- changing the radio frequency signal to adjust the first counter-intermodulation component in the transmission signal to reduce signal distortion associated with the first counter-intermodulation component and the second counter-intermodulation component.

* * * * *